United States Patent

Blaze

[11] Patent Number: 5,909,494
[45] Date of Patent: Jun. 1, 1999

[54] SYSTEM AND METHOD FOR CONSTRUCTING A CRYPTOGRAPHIC PSEUDO RANDOM BIT GENERATOR

[75] Inventor: Matthew A. Blaze, New York, N.Y.

[73] Assignee: AT&T Corp., Middletown, N.J.

[21] Appl. No.: 08/800,701

[22] Filed: Feb. 14, 1997

[51] Int. Cl.[6] .................................................. H04L 9/00
[52] U.S. Cl. .............................................. 380/37; 380/46
[58] Field of Search ................................ 380/37, 42, 46; 371/22.33, 27.2; 331/78; 364/717.01–717.07

[56] References Cited

U.S. PATENT DOCUMENTS

| | | | |
|---|---|---|---|
| 3,798,359 | 3/1974 | Feistel | 380/37 |
| 3,798,360 | 3/1974 | Feistel | 380/37 |
| 3,798,605 | 3/1974 | Feistel | 380/37 |
| 4,195,200 | 3/1980 | Feistel | 380/37 |

Primary Examiner—Salvatore Cangialosi

[57] ABSTRACT

A pseudo-random bit generator using at least one N-round Feistel construction that uses random functions. A block of data is permuted and divided into a stream word and a modification word. The stream word is used to build the pseudo-random bitstream. The modification word is used to modify a selected element of a random function used in a Feistel construction. When a single Feistel construction is used, its random functions are dynamically changed by the modification words as they are generated. When a plurality of Feistel constructions are used, the random functions of a selected inactive construction are modified by modification words generated by an active construction. When all of the elements of all of the functions of the inactive construction have been modified, the active and inactive functions are exchanged.

11 Claims, 2 Drawing Sheets

SYSTEM AND METHOD FOR CONSTRUCTING A CRYPTOGRAPHIC PSEUDO RANDOM BIT GENERATOR

FIELD OF THE INVENTION

This invention relates to a system and method for constructing a cryptographic pseudo random bit generator, and particularly to the use of a part of the output from a Feistel construction to alter the random functions of the same or another Feistel construction, with the remainder of the output used to build a pseudo random bit stream.

BACKGROUND OF THE INVENTION

Unlike most modern public-key ciphers, whose security relates to some long-studied mathematical problem that is believed to be difficult to solve (e.g., the factoring or finding discrete logarithms of large integers), the security of most modern symmetric-key pseudo random bit generators (PRBG) do not relate to any widely-studied, hard-to-solve problems. Rather, known PRBGs (e.g., implemented as stream ciphers) are generally designed in an ad hoc fashion to resist known cryptanalytic attacks. As a consequence, the design, analysis and implementation of reliably secure PRBGs is regarded as exceptionally difficult, and is often regarded as more of an art than a science.

The lack of a system and method for developing efficient PRBGs whose reliability and security can be understood or expressed analytically has resulted in the deployment of PRBGs whose security properties have been discovered to be considerably weaker than expected. The discovery of a new weakness in a PRBG undermines security of systems in which it is used, and results in inconvenience and economic loss if the discovered weakness is severe enough to warrant replacing the cipher.

A more serious problem arises if the cipher's user is unaware of a weakness that has been discovered by a third party. This weakness may be exploited without the knowledge of the user to undermine the security of the user's systems for an indeterminate amount of time. This can lead to the unauthorized modification of information (such as the dollar amounts of transfers specified by electronic funds transfer (EFT) messages) and/or the disclosure of confidential and/or sensitive information to unauthorized third parties (e.g., the disclosure of a trade secret.) Such security compromises can cause significant damage to the user and to third parties who rely upon the security of the cipher indirectly (e.g., account holders at a bank that uses EFT protected by the cipher.)

A PRBG with known security properties would eliminate much of the uncertainty surrounding the cipher's security. This would substantially reduce the risk of discovering an unexpected weakness in the cipher, allowing users to rely upon it with more confidence. A cipher with security properties known to be strong would reduce the risk of unauthorized modification and/or compromise of confidential and/or sensitive information. Michael R. Garey and David S. Johnson, *Computers and Intractability: A Guide to the Theory of NP-Completeness,* Freeman, 1979.

Known PRBGs tend to be conceptually complex. They are often characterized by "magic" constants (i.e., apparently arbitrary constants that have a poorly understood effect on the security of the cipher), irregular structures, and awkward bit-level operations that are inefficient and expensive to implement on computers and/or in telecommunications systems. It is virtually impossible to mathematically comprehend the justifications for many of the various parameters in a typical cipher. These features of known PRBGs can lead a user to improperly implement the cipher in software and/or hardware. Improperly implementing even a single step in some ciphers can render them far less secure.

Cryptanalytic attacks against known PRBGs have often been successfully carried out using known mathematical techniques. For example, the linear feedback shift register algorithm can be compromised by the algebraic manipulation of a few bits of output. A PRBG that cannot be successfully attacked with known mathematical techniques would be more secure than many known PRBGs.

The goal of a PRBG is to provide a cryptographically secure sequence of bits (a "bitstream") that, when applied as a stream cipher, can be added to a cleartext to produce ciphertext and subtracted from the ciphertext to recover cleartext. Cryptographic PRBGs are also used to generate key material and other constants as part of more complex cryptographic protocols.

An ideal cryptographic bit generator is one in which there is no relationship between any one subset of bits in the bitstream and any other subset of bits in the bitstream. That is, the most efficient (compact) representation of the bitstream is simply a complete list of all the bits in the sequence. Such a bit generator is said to be unconditionally secure because knowing any subset of the generated bits does not provide sufficient information to predict the contents of any other subset of generated bits.

In practice, a mathematical function is used to generate a pseudo random stream of bits based upon a small number of bits that comprise the secret state of the generator (e.g., a seed). The most efficient stream generator functions suffer from the disadvantages of complexity and poorly understood security properties, as described above.

It is possible to use a block cipher construction to build a PRBG. One commonly used method is output feedback, in which the previous output of a block cipher is used to provide both the next input to the block cipher and the current stream output. Another known method is counter mode, in which an increasing counter is used as the input to the block cipher and the current stream output is simply the output of the block cipher.

The goal of a block cipher is to provide a reversible transformation on blocks of bits. More precisely, block ciphers are reversible pseudo random permutations that map each of the $2^n$ possible inputs to a unique n-bit output value. An ideal block cipher would be a completely random permutation, i.e., the only possible representation of the transformation would be a list that completely maps each possible input to an output, and vice versa. This is called a "random function." An example of such a random function for three bit blocks (each of which was selected at random) is as follows:

| INPUT  | 000 | 001 | 010 | 011 | 100 | 101 | 110 | 111 |
|--------|-----|-----|-----|-----|-----|-----|-----|-----|
| OUTPUT | 010 | 111 | 000 | 110 | 100 | 001 | 011 | 101 |

A truly random function is said to be unconditionally secure because there is no correlation between any one subset of mappings and any other, i.e., the most compact representation of the function is simply a list of all of its mappings of inputs to outputs. Truly random functions can be cumbersome to represent in computer-readable memory for practical block ciphers, and hence are often replaced with pseudo-random functions (PRF) that map inputs to outputs in an apparently random fashion in accordance with a prescribed method. For the most part, only the method (and not the complete listing) of a PRF need be stored in computer-readable memory, resulting in a more efficient implementation of the cipher. The drawback is that a PRF is not unconditionally secure.

A known block cipher is the Feistel construction. H. Feistel, "Cryptography and Computer Privacy." *Scientific American,* Vol. 228, 1973. The Feistel primitive is shown symbolically as follows:

```
X = A|B           /*cleartext*/
A = A + f_e
B = B + A
X = B|A           /*ciphertext*/
```

X=A|B indicates that block of data X has two concatenated halves A and B ("|" indicates concatenation). Entry $f_e$ of PRF f is added in this embodiment bitwise modulo-2 (represented by the "+" operator) to A. The result replaces A, which is then added to B modulo-2, resulting in a new value for B. The positions of A and B are switched and concatenated to form a permuted X=B|A. The primitive can repeated again any number of times using a different PRF each time. Each instance that the primitive is invoked is called a "round." An symbolic representation of a four round Feistel construction is as follows:

```
X = L|R           /*cleartext*/
R = R + f_1(L)
L = L + f_2(R)
R = R + f_3(L)
L = L + f_4(R)
X = L|R           /*ciphertext*/
```

Here, $f_1$, $f_2$, $f_3$ and $f_4$ are secret pseudo random functions. For a four round, 2n-bit Feistel construction using four n-bit functions a 2n-bit block is divided into a right half R and a left half L in step 1. In step 2, the n-bit left half L of a 2n-bit block X is permuted with a pseudo random function $f_1$ and added to the n-bit right half R of the block. The result becomes the new right half R. In step 3, the permuted right half R is permuted with another PRF $f_2$ and added to left half L. The result becomes the new left half L. In step 4, the L is permuted with another PRF $f_3$ and added to R, the result of which becomes the new R. In step 5, R is permuted with PRF $f_4$ and added to L, the result of which becomes the new L. In step 6, an enciphered block X=L|R is obtained.

In order to decipher a block enciphered with the Feistel primitive, the order of the steps of the primitive are reversed and carried out on the enciphered block. This is shown for the Feistel primitive as follows:

```
X = B|A           /*ciphertext*/
B = B + A
A = A + PRF
X = A|B           /*cleartext*/
```

In order to decipher blocks enciphered with multiple rounds, the rounds should be reversed in reverse order, the most recently used round first. In other words, if the primitive is applied in the sequence r1, r2, . . . , r5, the reverse primitive should be applied in the order r5, r4, . . . , r1 to decipher the block. This is shown as follows:

```
X = L|R           /*ciphertext*/
L = L + f_4(R)
R = R + f_3(L)
L = L + f_2(L)
R = R + f_1(L)
X = L|R           /*cleartext*/
```

Luby and Rackoff showed that if the PRF in an at least four-round Feistel construction are themselves secure, then the resulting permutation is secure. M. Luby and C. Rackoff, "How to Construct Pseudo random Permutations from Pseudo random Functions." *SIAM J., Comput.,* 17 (1988), 373–386. However, Luby and Rackoff provided no information on how to determine if an arbitrary PRF is in fact secure. Thus, a system and method that uses functions known to be secure in an at least four-round Feistel construction will produce permutations that are known to be secure.

The Feistel construction cipher is advantageous because its security (using at least 3 rounds, more preferably at least 4 rounds, and most preferably at least 6 rounds) is closely related to the difficulty of solving the Numerical Matching with Target Sums (NMTS) problem, an NP-Complete problem for which there are no known mathematical techniques to analytically solve. In other words, the only known way to compromise a Feistel construction cipher of three or more rounds is by brute force (e.g., trying all possibilities.)

The security of a stream cipher is partly determined by the period length of the secure bitstream. The bitstream period length is the number of blocks that can be generated before the sequence begins to repeat itself. When the sequence repeats itself, it can be cryptanalytically attacked using known methods. For a block size of 2n there are $2^2$ n different blocks, and thus a period length of $2^2$ n. The larger the block size, the longer the bitstream period length, and the more secure the PRBG stream cipher. Although increasing the block length increases the security of the bitstream, increasing block length also increases processing time and requires more computer-readable memory, reducing the efficiency of the stream cipher.

A better PRBG stream cipher would possess the advantage of having known security properties such as those disclosed by Luby and Rackoff for the Feistel construction, and be able to be efficiently and practically implemented on computers within the present state of the art.

SUMMARY OF THE INVENTION

The present invention is a PRBG that uses at least a part of the output of a Feistel construction using random functions to modify the at least one random function of the same or another Feistel construction. The remainder of the output is used as part of a pseudo random bitstream.

When a plurality of Feistel constructions are employed, one construction is designated as the active construction, and the rest as inactive. One of the inactive constructions is selected and its at least one random function is modified with output from the active construction. When every entry in the inactive construction has been modified, then the selected inactive Feistel construction becomes active, and the active construction becomes inactive.

When a single Feistel construction is used, the output of the construction is used to modify the construction's own random function in an ongoing fashion.

The present invention uses secure random functions in the initial Feistel construction. In accordance with the information disclosed by Luby and Rackoff, the permutations produced by each construction are also secure. This security is closely related to the difficulty of solving the NMTS problem, an NP Complete problem that cannot be solved analytically using known mathematical techniques. The speed of the present invention implemented in software on known computers is comparable to that of known PRBGs.

DETAILED DESCRIPTION

In accordance with the present invention, a block of data of 2n bits permuted by a Feistel construction is halved into a "modification word" used to modify the at least one random function of a Feistel construction, and a "stream word" that is used to build a pseudo random bitstream. In one embodiment of the present invention, input block is a counter value. In another embodiment, each half of the input block is a counter value.

Figure 1:
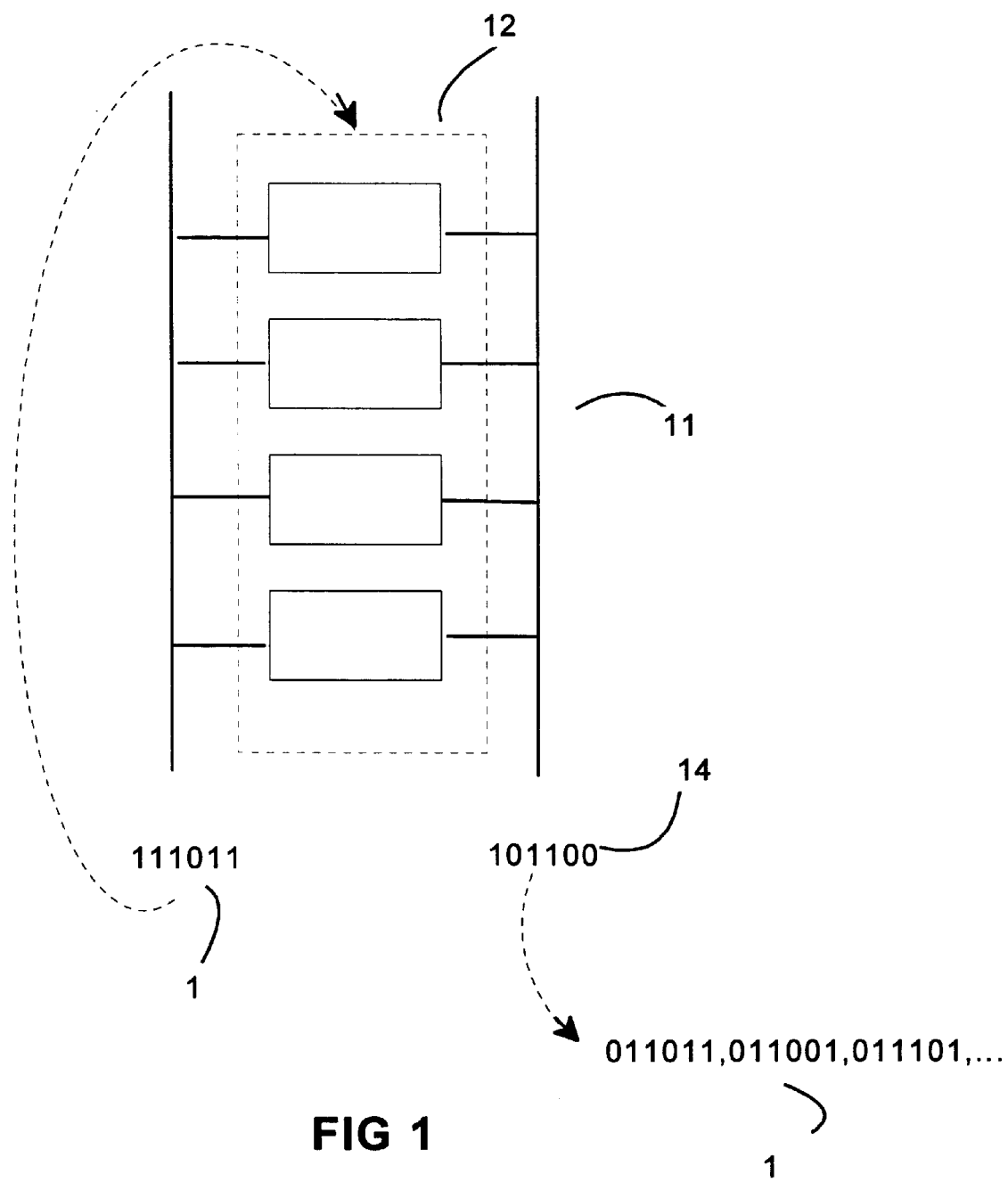
FIG. 1 shows an embodiment of the present invention using a single Feistel construction.

In one embodiment of the present invention, only a single Feistel construction is used, with the modification word used to modify the random function of the Feistel construction itself. Thus, the random functions of the single Feistel construction are modified in an ongoing fashion dynamically as the Feistel construction permutes input blocks. This is shown in FIG. 1. Feistel construction 11 generates a modification word 13 and a stream word 14. Stream word 14 is used to build pseudo random bitstream 15. Modification word 13 is used to modify a random function in the set of random functions 12 of the Feistel construction. This process is iterated as long as there is a need for further stream words 14 for bitstream 15.

In another embodiment of the present invention, a plurality of Feistel constructions are established, one being active and the rest inactive. A block of input data of length 2n bits is permuted by the active Feistel construction. The permuted block is then halved into the stream word and the modification word, each of length n bits. The stream word is used to build the pseudo random bitstream, and the modification word is used to modify a random function in a selected inactive Feistel construction. This modification is carried out in one embodiment of the present invention by adding the modification word bitwise modulo-2 to an entry in the random function of the Feistel construction. This is repeated until all of the entries in all of the random functions of the selected inactive construction have been modified.

When all of the entries in the random functions of the selected inactive construction have been modified, the inactive construction becomes the active construction, and the active construction becomes an inactive construction. Each random function in the inactive Feistel construction requires $2^n$ n-bit words for the random function to be completely modified. Thus, an inactive N-round Feistel construction requires $N2^n$ n-bit words generated from the active Feistel construction in order to be completely modified.

Another inactive Feistel construction is selected for modification in accordance with various approaches. In one embodiment, the next Feistel construction is selected in a round-robin fashion from the inactive constructions. In another embodiment, the next construction is selected randomly from the inactive constructions. A pseudo-code embodiment of the present invention with a plurality of N-round Feistel constructions (called Hare) is as follows:

```
Hare(X) = {
  k = 1   /* k is an index for the kth entry of
           random function f_inactive */
  while k is less than or equal to N2^n {  /* N is the
                                            number of
                                            rounds in
                                            the Feistel
                                            construation */
    n=1    /* n is an index for the nth
            funation in an N-round Feistel
            construation */
    while n is less than or equal to N {
      X = L|R   /* L and R are counters in this
                 embodiment */
      R = R + f_{n,active}(L)
      X = R|L
    }
    f_{n,k,inactive} = f_{n,k,inactive} + R  /* modify the kth entry of
                                              the nth random function of
                                              the selected inactive
                                              construction by adding R
                                              bitwise modulo-2 */
    k = k + 1
    bitstream = L       /* use L to build the
                         bitstream */
  }
  swap active, inactive   /* after all of the
                           entries of the inactive
                           Feistel construction are
                           modified by the
                           modification words
                           generated by the active
                           construction, swap the
                           active with the inactive
                           construction. The
                           bitstream is continued by
                           repeating this method for
                           the new active Feistel
                           construction, and so on. */
}
```

Figure 2:
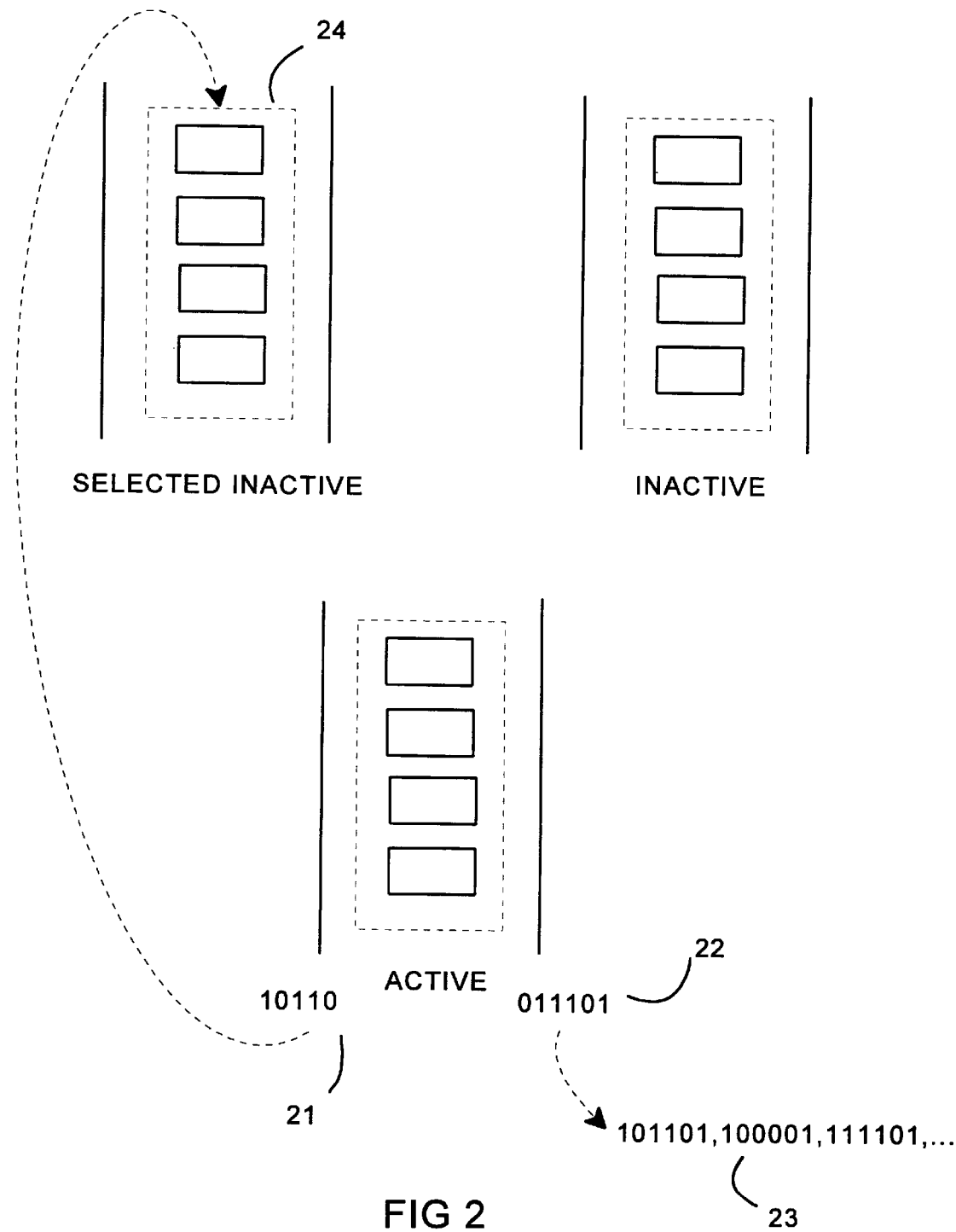
FIG. 2 shows an embodiment of the present invention using three Feistel constructions.

An embodiment of the present invention that uses three Feistel constructions is shown in FIG. 2. The active Feistel construction produces a modification word 21 and a stream word 22. Stream word 22 is used to build pseudo random bitstream 23. Modification word 21 is used to modify a random function in the set of random functions 24 in the selected inactive Feistel construction. When all of the entries of all of the random functions 24 of the selected inactive Feistel construction have been modified by modification words 21, the selected inactive Feistel construction is swapped with the active construction, i.e., the selected inactive construction becomes the active construction, and the formerly active construction becomes inactive. The next construction selected for modification is chosen from the inactive constructions in a round robin, random, or other suitable selection strategy.

The present invention provides an economical, efficient and practical method for generating a pseudo random bitstream with known security properties.

What is claimed is:

1. A method for generating a pseudo-random bitstream, comprising the steps of:
   a. selecting an active N-round Feistel construction from a plurality of Feistel constructions;
   b. selecting an inactive N-round Feistel construction;
   c. permuting a block of data using the active N-round Feistel construction;
   d. dividing the permuted block of data into a modification word and a stream word;

e. assigning the stream block to the pseudo-random bitstream;

f. selecting an element of a random function of the inactive Feistel construction;

g. modifying the selected element of the inactive Feistel construction using the modification word;

h. determining if all of the elements of all of the random functions of the inactive construction have been modified by modification words generated by the active construction; and i. if all of the elements of all of the random functions of the inactive construction have been modified, then designating the inactive construction to be the active construction, and designating the active construction to be an inactive construction; and j. if additional bits are required for the bitstream, carrying out step b and the ensuing steps.

2. The method of claim 1, wherein the inactive Feistel construction of step b is selected from a plurality of Feistel constructions in a round-robin fashion.

3. The method of claim 1, wherein the inactive Feistel construction of step b is selected from a plurality of Feistel constructions in a random fashion.

4. The method of claim 1, wherein the modification of step g comprises the step of adding the modification word to the selected element.

5. The method of claim 1, wherein the modification of step g comprises the step of replacing the selected element with the modification word.

6. A method for generating a pseudo-random bitstream, comprising the steps of:

a. permuting a block of data using an N-round Feistel construction;

b. dividing the permuted block of data into a modification word and a stream word;

c. assigning the stream block to the pseudo-random bitstream;

d. selecting an element of a random function of the Feistel construction; and e. modifying the selected element of a random function of the Feistel construction using the modification word;

f. if additional bits are required for the bitstream, carrying out step a and the ensuing steps.

7. The method of claim 6, wherein the random function element of step d is selected in a round-robin fashion.

8. The method of claim 6, wherein the random function element of step d is selected in a random fashion.

9. The method of claim 6, wherein the modification of step e comprises the step of adding the modification word to the selected element.

10. The method of claim 6, wherein the modification of step e comprises the step of replacing the selected element with the modification word.

11. A system for cryptographically processing cleartext and ciphertext, comprising:

a. a first processor with computer readable memory, said first processor permuting a plurality of blocks of data using a Feistel construction with random functions, the random functions permuted by a first portion of a permuted block of data from the Feistel construction, and a pseudo random bitstream built from a second portion of a permuted block of data, said bitstream used to permute cleartext into ciphertext;

b. a communications channel; and c. a second processor with computer readable memory, said second processor permuting said plurality of blocks of data using said Feistel construction used by said first processor, the random functions of said Feistel construction permuted by a first portion of a permuted block of data from the Feistel construction, and a pseudo random bitstream built from a second portion of a permuted block of data, said bitstream used to permute ciphertext received from said first processor through said communications channel into cleartext.

* * * * *